Figure 1:
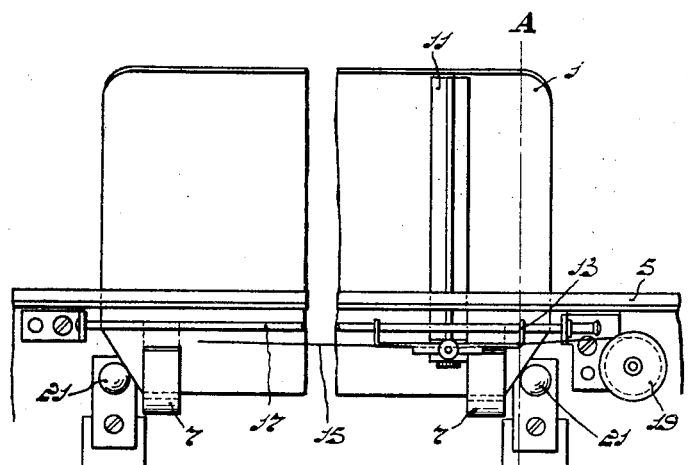

June 13, 1950     J. C. A. RECOURT     2,511,220

RADIO RECEIVER INDICATOR

Filed Feb. 6, 1947

J. C. A. RECOURT

INVENTOR

BY *Fred M. Vogel*

AGENT

Patented June 13, 1950

2,511,220

UNITED STATES PATENT OFFICE 2,511,220

RADIO RECEIVER INDICATOR

Johannes Christoffel Antonie Recourt, Eindhoven, Netherlands, assignor to Hartford National Bank and Trust Company, Hartford, Conn., as trustee Application February 6, 1947, Serial No. 726,759
In the Netherlands June 27, 1944

Section 1, Public Law 690, August 8, 1946
Patent expires June 27, 1964

6 Claims. (Cl. 116—124.1)

This invention relates to an electric apparatus having a cabinet, more particularly to a wireless receiver of the kind comprising an isolated scale mounted on top of the cabinet and along which an index can be moved.

In an existing form of construction of wireless receivers thus designed the scale (station scale) consists of a single plate of transparent material, for example of glass, which is so constructed as to be rotatable about a shaft located over the cabinet so that the position of the scale may be adjusted at will by the operator of the apparatus. When shipping the apparatus the scale is collapsed against the upper wall of the cabinet in order that damage to the scale may be avoided as much as possible.

Transparent scales of this kind are used with advantage in wireless sets because these scales may be made comparatively large in size without making the cabinet appear unduly tall as occurs when opaque collapsible scales are used.

The present invention provides a scale construction which is appreciably cheaper than the existing constructions and which satisfies the technical requirements to be imposed without detracting from the esthetic advantages. The invention is based on the recognition of the fact that in practice collapsible scales are always used in approximately the same position which is slightly inclined backward. Evidently it is in practice not essential for the position of the scale to be easily adjustable. Now, according to the invention, instead of being collapsible, the scale is fastened to the cabinet so as to be readily detachable, whereas the index may be brought into a position in which it does not project above the cabinet, by being provided so as to be readily detachable for example, or to be collapsible against the upper wall of the cabinet. During transport the scale is removed and packed separately and the index is also disengaged, for example unscrewed, or collapsed against the upper wall of the cabinet and fastened thereon, for example, with the aid of adhesive tape.

It is evident that owing to the absence of the hinged construction the scale according to the invention can be considerably cheaper than the constructions in existence. The collapsible construction for the index may be maintained without any difficulty since the cost thereof, as will appear hereinafter, may be small.

A very efficacious construction is obtained if the upper wall of the cabinet comprises a slot through which the scale is passed whilst the fastening means are provided inside the cabinet. When the scale is taken out the upper wall of the cabinet is entirely smooth, which facilitates packing whilst any damage to the fastening means is impossible. Another advantage is that the lamps for the illumination of the scale may be provided inside the cabinet, owing to which a particular cover for these lamps for the purpose of screening them from alive parts and avoiding undesirable radiation of light is redundant.

If desired, the fastening means may be such that the scale can be fastened in two or more positions at different angles of inclination, in which event the index is pressed against the scale, for example, by means of resilient force.

Figure 2:
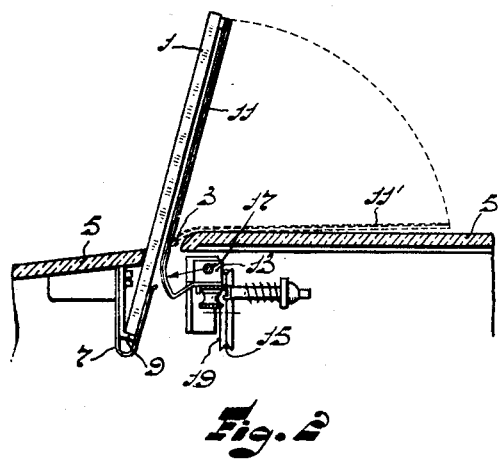

The invention will be explained more fully by reference of the accompanying drawing in which that portion of a wireless receiver according to the invention which is essential for the invention is shown in a back view in Fig. 1 and in section in Fig. 2 which view is normal to the plane of drawing of Fig. 1 along the line A—A.

The construction of the scale shown in the figures comprises a transparent scale 1, for example of glass, which is passed (see Fig. 2) through a slot 3 provided in the upper wall 5 of the cabinet of a wireless receiver and is retained by means of a pair of resilient clamps 7 arranged inside the cabinet. Two stops 9 prevent the scale from being introduced too far into the cabinet. Along the back of the scale 1 there is provided a movable index 11 which also extends through the slot 3 and one extremity of which is connected to an index slide 13 which can slide in the usual manner by means of a driving cord 15 along a guide rod 17 provided in the cabinet. The guiding of the cord 15 is arranged in such manner (one of the guide discs 19 can be seen in Fig. 1 and another in Fig. 2) that the tensile strength in the cord yields a component which forces the index 11—which is pivoted on the rod 17—against the scale 1 (see Fig. 2). The scale is illuminated by two lamps 21 which need not be screened owing to their arrangement inside the cabinet of the apparatus.

Prior to the packing of the apparatus for transport the scale 1 is removed, the index 11 mounted on the guide rod 17 as the shaft being collapsed against the wall 5. The collapsed index 11' is shown in dotted lines in Fig. 2. In order to permit this collapsing operation to be effected the portion 11 of the index which in the ordinary position does not protrude above but in the collapsed position lies above the wall 5 is circular in shape with the shaft 17 as the centre of curvature. As it appears from Fig. 2, this constructional step permits of collapsing the index without any additional cost. During transport the index may be fixed against the wall 5, for example, by means of adhesive tape.

If desired, it is possible for example to provide two sets of clamps 7 in the cabinet so as to enable the scale to be fixed in the cabinet in two different positions at different angles of inclination. Furthermore, instead of being fixed by the resilient clamps 7, the scale 1 may be fixed by means of clamping screws which must be unscrewed beforehand when the scale is removed. Besides, instead of being collapsible, the index may also be capable of being screwed out. Further it is possible to provide the index so as to be collapsible in the plane, parallel to the scale, in which the index moves.

What I claim is:

1. Tuning indicating apparatus for a cabinet type radio receiving set comprising a cabinet having a wall portion provided with a slot-like opening, a dial member consisting of a scale plate of transparent material, at least one clamp-like member mounted on the inner side of the said wall portion, a guide member mounted within said cabinet and an index member, said dial member extending through said slot and into the said clamp-like member so as to be non-rockably removably attached to said clamp-like member with the greater part thereof projecting from the said cabinet, said index member being slidably mounted on said guide member with a limited degree of rotary motion and provided with a pointer-like resilient portion extending through said slot for movement with said index member along and against said dial member, said pointer-like portion being collapsible against the said wall portion by a flexing of the said pointer-like portion about the axis of the said guide member.

2. Tuning indicating apparatus for a cabinet type radio receiving set comprising a cabinet having a wall portion provided with a slot-like opening, a dial member consisting of a scale plate of transparent material, at least one resilient clamp-like member mounted on the inner side of the said wall portion, a guide member mounted within said cabinet and an index member, said dial member extending through said slot and into the said clamp-like member so as to be non-rockably removably fastened to said clamp-like member with the greater part projecting upwardly at an angle from the said cabinet, said index member being slidably mounted on said guide member with a limited degree of resilient rotary motion and provided with a resilient pointer-like portion extending through said slot for movement with said index member along said dial member, said pointer-like portion being collapsible against the said top portion by rotation of the said pointer-like portion about the said guide member.

3. Tuning indicating apparatus for a cabinet type radio receiving set comprising a cabinet having a wall portion provided with a slot-like opening, a dial member consisting of a scale plate of transparent material, at least one resilient clamp-like member mounted on said wall portion, a guide member mounted within said cabinet and an index member, said dial member extending into the said clamp-like member so as to be non-rockably removably fastened to said clamp-like member, said index member being slidably mounted on said guide member with a limited degree of rotary motion and provided with a spring-like pointer portion extending through said slot for movement with said index member along and against said dial member, said pointer portion being collapsible against the said wall portion by a rotation of the said pointer portion about the said guide member.

4. Tuning indicating apparatus for a cabinet type radio receiving set comprising a cabinet having a wall portion provided with a slot-like opening, a dial member consisting of a scale plate of transparent material, at least one clamp-like member mounted on the inner side of the said wall portion, a guide member mounted within said cabinet and an index member, said dial member extending through said slot and into the said clamp-like member so as to be non-rockably removably attached to said clamp-like member with the greater part projecting from the said cabinet, said index member being slidably mounted on said guide member with a limited degree of rotary motion and provided with a pointer-like portion extending through said slot for movement with said index member along said dial member, said pointer-like portion being collapsible against the said wall portion with a rotation of the said pointer-like portion about the axis of the said guide member.

5. Tuning indicating apparatus for a cabinet type radio receiving set comprising a cabinet having a wall portion provided with a slot-like opening, a dial member consisting of a scale plate of transparent material, at least one clamp-like member mounted on the inner side of the said wall portion, a guide member mounted within said cabinet and an index member, said dial member extending through said slot and into the said clamp-like member so as to be non-rockably replaceably attached to said clamp-like member with the greater part projecting slant-wise from the said cabinet, said index member being slidably mounted on said guide member with a limited degree of rotary motion and provided with a pointer-like portion extending through said slot for movement with said index member along said dial member, said pointer being collapsible against the said cabinet top portion by a rotation of the said pointer-like portion about the said guide member.

6. Tuning indicating apparatus for a cabinet type radio receiving set comprising a cabinet having a wall portion provided with a slot-like opening, a dial member consisting of a scale plate of transparent material, at least one resilient clamping member mounted on the inner side of the said wall portion, a guide member mounted within said cabinet and an index member, said dial member extending through slot and into the said clamping member so as to be non-rockably removable fastened to said clamping member with the greater part projecting slantwise from the said cabinet, said index member being slidably mounted on said guide member with a limited degree of rotary motion and provided with a resilient pointer-like portion extending through said slot for movement with said index member along said dial member, said pointer-like portion being collapsible against the said top portion by a rotation of the said pointer-like portion about the said guide member.

JOHANNES CHRISTOFFEL
ANTONIE RECOURT.

REFERENCES CITED

The following references are of record in the file of this patent:

UNITED STATES PATENTS

| Number | Name | Date |
|---|---|---|
| 2,138,359 | Siepke | Nov. 29, 1938 |

FOREIGN PATENTS

| Number | Country | Date |
|---|---|---|
| 413,946 | Great Britain | July 26, 1934 |